May 2, 1967  W. J. DUMMLER  3,317,053
FILTER UNIT WITH AXIALLY SEPARABLE HOUSING
Filed March 4, 1964
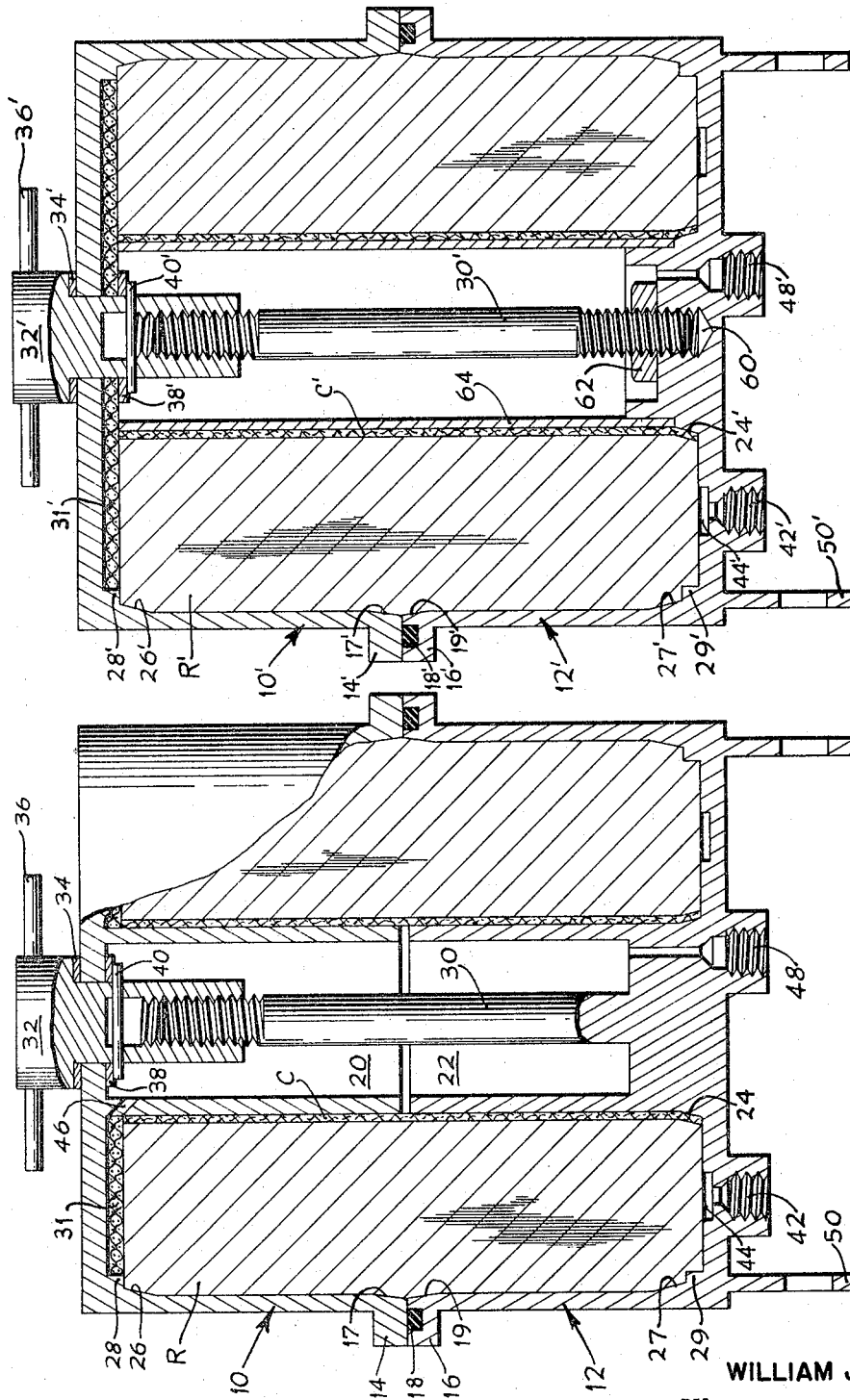
INVENTOR.
WILLIAM J. DUMMLER
BY Paul B. Fihe
PATENT AGENT

United States Patent Office 3,317,053
Patented May 2, 1967

3,317,053
FILTER UNIT WITH AXIALLY SEPARABLE HOUSING
William J. Dummler, San Jose, Calif., assignor to Motor Guard Corporation, San Jose, Calif., a corporation of California
Filed Mar. 4, 1964, Ser. No. 349,226
7 Claims. (Cl. 210—439)

The present invention relates generally to filter units arranged for the continuous filtration of oil such as may be circulated in an internal combustion engine lubricating system, and more particularly to improvements in oil filter units of the type described in my prior United States patent application Ser. No. 310,754 entitled, "Filter Unit With Radially Compressed Element."

In normal operation, it is well known that lubricating oils for internal combustion engines become "dirty," which signifies that water, carbon, sulfur, and other impurities have accumulated to reduce the lubricating qualities of the oil. To remove such impurities, it is established practice to utilize filters, and, in view of the fact that it is impractical to cleanse the existent filters, as, for example, by reverse flushing which is commonly done in commercial filtration processes, the filter units normally contain a replaceable cartridge. Such cartridges have for the most part been relatively expensive and it is normally recommended that these replaceable filter cartridges be changed almost as frequently as the engine oil itself. Consequently, the considerable expense is only justified in relation to the greater expense which would be involved in more frequent engine repair if the oil were not continuously filtered or changed.

In an effort to reduce the cost of the replacement cartridge, recent filter units utilizing a roll of absorbent paper of a type corresponding to ordinary "toilet tissue" have been introduced; the paper acts as the filtering medium and has proven for the most part to have excellent characteristics for this purpose. However, several deficiencies have been noted; in the first place, there has been some difficulty both in the appropriate insertion and subsequent removal of the roll of paper, and secondly, when the roll is not precisely inserted, channels are formed enabling some or all of the oil to actually by-pass the paper filtering medium itself wherefore its utility is seriously reduced.

The structures described in my aforementioned prior patent application were directed to a solution of these existent problems and it is a general object of the present invention to provide further improvements in oil filter units including a roll of paper tissue or other compressible filtering material which provides effective filtration and at the same time facilitates insertion and/or withdrawal of the expendable filter element.

More particularly, it is a feature of the present invention to provide an oil filter unit including a housing composed of two generally similar cup-shaped sections arranged to encompass a roll of tissue paper with the roll and cup axes coincidental so that separation of the cups exposes substantially one half of the paper roll.

Additionally, it is a feature of the invention to provide a filter unit wherein the aforementioned cup-shaped sections are arranged to simultaneously effect a tight seal between the lip portions of the cup-shaped sections and axial and radial compression of the enclosed paper roll to effectively preclude oil by-pass of such paper roll or other filter element.

Additionally, it is a feature of the invention to provide a filter unit wherein the oil inlet thereto is positioned so that the pressure of the incoming oil itself assists in the sealing of the paper roll filter to the housing so as to further insure against by-pass of the oil around the filter element.

In addition, it is a feature of the invention to provide a filter unit including two generally cup-shaped sections that are secured in sealing relation by the appropriate turning of a single threaded member.

A correlated feature is the mounting arrangement for such securing member so that turning thereof to disassemble the unit forceably effects separation of the two cup-shaped housing sections.

It is another feature of the invention to provide a filter unit which includes a housing formed by two generally cup-shaped sections, at least one of which has an inner concentric tubular member which serves to center the roll of paper in the unit and at the same time form a conduit for passage of oil centrally therethrough.

Additionally, it is a feature of the invention to provide a filter unit including two cup-shaped sections designed so that they can both be formed from castings in a manner such that but a minor amount of finish machining operations are requisite.

These as well as other objects and features of the invention will become more apparent from a perusal of the following description of the structures shown in the accompanying drawing wherein:

FIG. 1 is a side elevational view of a filter unit constituting one embodiment of the invention, a substantial portion of the structure being broken away and shown in central longitudinal section to illustrate interior details thereof, and FIG. 2 is a central longitudinal sectional view taken through a filter unit constituting a slightly modified embodiment of the invention.

With initial reference to FIG. 1, the first embodiment of the invention includes a housing whose overall dimensions are such as to closely encompass a standard roll R of toilet tissue. More particularly, such housing includes two separable cup-shaped sections 10, 12 of approximately equivalent dimensions. At their lips, both cups are provided with mating flanges 14, 16, the flange 16 on the lower cup having a circular groove in its upper surface to receive a standard rubber O-ring 18 so that upon application of axial pressure, the cup juncture is effectively sealed. When so joined, the axial length of the housing is preferably slightly less than the length of the paper roll R which of course is inserted while the sections 10, 12 are separated. To enable ease of insertion of a roll R into the cup-shaped sections 10, 12, the walls are slightly tapered adjacent the flanges 14, 16, as indicated at 17 and 19.

Concentrically within both cup sections 10, 12, similar integral tubular members 20, 22 project from the bases of the cup-shaped sections to project inwardly and terminate at a position such that when the exterior cup flanges 14, 16 are joined, the extremities of the tubular members are adjacent but not quite touching. Such tubular members 20, 22 are dimensioned to receive telescopically thereover the cardboard core C of a conventional roll R of toilet tissue thereon and to preclude collapse of the core C when oil pressure is experienced.

To insure radial sealing engagement between the described cup-shaped sections 10, 12 and a roll R of toilet tissue inserted therewithin, the bottom portion of the tubular member 22 in the lower cup-shaped section 12 is tapered as indicated 24 and similar tapered portions 26, 27 are formed on the interior of both cup-shaped sections 10, 12 adjacent the base portions thereof. Consequently, axial pressure exerted on the roll R and its core C will force the lower end thereof between the tapered portions 24, 27 and effect radial compression of the roll R of toilet tissue at such position. Preferably, small rectangular steps 28, 29 are also formed in both cup-shaped sections 10, 12 at the juncture of its side wall and base and a pair of annular screen sections 31 are disposed against the base between the step 28 and the tubular member 20.

In order to releasably secure the cup-shaped sections 10, 12 in sealed enclosure of a roll R of toilet tissue, a stud 30 is integrally secured to the center of the lower cup-shaped section 12 to project axially upward through the tubular members 20, 22 of both sections. The upper threaded extremity of such stud 30 is arranged to receive a cap nut 32 which slidably and rotatably extends through an axial opening in the base of the upper cup-shaped section 10. Exterior of the housing, the cap nut 32 is enlarged and carries a gasket 34 arranged to sealingly engage the exterior of the upper cup-shaped section 10 when the cap nut is screwed down onto the stud 30, preferably through utilization of a suitable handle 36. As such cap nut 32 is tightened, it forces the upper cup-shaped section 10 downwardly to compress the O-ring 18 between the flanges 14, 16 and simultaneously to axially compress the roll R of paper therewithin as will be explained in more detail hereinafter. Interiorly of the upper cup-shaped section 10, the cap nut 32 carries a washer 38 held adjacent the inner surface of the base of such cup-shaped section by a spring retainer ring 40 so that when the cap nut 32 is turned to loosen the same on the stud 30, the upper cup-shaped section 10 is forceably separated from the lower cup-shaped section 12 and the compressive force on an enclosed roll R of tissue is relieved.

To provide for ingress of oil into the filter unit, an interiorly-threaded inlet opening 42 is provided in the base of the lower cup-shaped section 12, the upper extremity of such opening terminating in an annular groove 44 formed in the base of the lower cup-shaped section at a position approximately half way between the side wall of such cup-shaped section and the interiorly-concentric tubular member 22 thereof. When the cap nut 32 is tightened to effect sealing juncture of the two cup-shaped sections 10, 12 and axial compression of the roll R of tissue as mentioned, such tissue is forced slightly into the annular groove 44 and a rather effective seal is provided at each edge of the groove. Accordingly, when oil is delivered through the inlet opening 42 under pressure, it is directed centrally into the roll R of paper and thus exerts further forces in divergent radial directions to press the exterior and interior surfaces of the roll R and core C against the tapered portions 27, 24 on the side wall and interior tubular member 22 of the lower cup-shaped section 12 thus to effectively preclude any by-pass of oil exteriorly or interiorly of the filtering medium.

An opening 46 is provided through the tubular member 20 of the upper cup-shaped section 10 adjacent its base so that oil which has passed upwardly through the entire roll R of paper can then pass to the interior of such tubular members 20, 22 to an outlet opening 48 formed at one side of the stud 30 in the base of the lower section 12, such opening being suitably threaded to provide for connection of an oil conduit and also having restricted dimensions to provide requisite control of oil flow.

The pair of annular screen sections 31 which are disposed adjacent the base of the upper cup-shaped section 10, are sufficiently thick to extend below the lower extremity of the oil opening 46 through the tubular member 20, thus to preclude the discharge of any paper through such opening and thence through the oil outlet 48.

Suitable brackets 50 are provided on the lower cup-shaped section 12 to enable mounting of the filter unit adjacent an internal combustion engine whose oil is to be filtered thereby and suitable connections to the oil inlet and outlet openings 42, 48 are then made. A fresh roll R of toilet tissue is placed into the lower cup-shaped section 12 from which the upper cup-shaped section 10 has been previously removed. Ease of placement of the roll of tissue in such position is insured by the taper 19 adjacent the lip portion of the lower cup-shaped section 12. It is not necessary that the roll R of paper be pushed entirely to the bottom of the lower cup-shaped section 12 since final insertion is obtained during completion of assembly of the unit.

After the roll R is positioned in the lower cup-shaped section 12, the upper cup-shaped section 10 is pressed thereover, again ease of such placement being assured by the taper 17 adjacent the lip portion of the upper cup-shaped section. Manual pressure downwardly on the upper cup-shaped section 10 will readily bring the cap nut 32 into initial engagement with the central stud 30. Thereafter, turning of such cap nut 32 will quickly effect sealed seating of the upper cup-shaped section 10 over the lower cup-shaped section 12. During such tightening, the lower extremity of the roll R of tissue is axially urged toward the base so that engagement of the roll R and core C with the tapered portions 24, 27 cams the adjoining portion of the roll and core to effect radial compression thereof. In addition, as previously mentioned, the central annular portion of the roll R is urged into the annular groove 44 in the base which receives the incoming oil. Lowering of the upper cup-shaped section 10 by the turning of the cap nut 32 also effects a radially-inward pressure through the taper 26 adjacent the base of the upper cup-shaped section 10 to again effect a radial compression of the roll of toilet tissue at this position. The steps 28 and 29 at the corner of the base and side wall of the cup-shaped sections 10 and 12 serve to crimp the roll R of tissue at these positions to further preclude any possibility of oil by-pass. In summation, all of the oil entering the unit is forced to pass through the compressed roll of tissue and thence through the screen sections 31 into the central tubular members 20, 22 and finally through the outlet 48 for recirculation through the engine.

After a predetermined period of use, the roll R of toilet tissue can be easily removed. More particularly, the cap nut 32 is first loosened which forceably pulls the upper cup-shaped section 10 from its tight position on the roll. After the cap nut 32 has become disengaged from the upper end of the threaded stud 30, the upper cup-shaped section 10 can be easily manually lifted so that the entire upper half of the roll R of paper is exposed. The roll R can then be readily grasped and removed from its seat within the lower cup-shaped section 12 and a new roll can be immediately reseated therewithin, the entire process of replacement taking little more than one minute. Even though such replacement is quick, once the sections 10, 12 have been reassembled, the tight compressive fit is assured.

It will be observed that the cup-shaped sections 10, 12 shown in FIG. 1 are relatively simple structures which can be formed from castings. The central stud 30 can be cast within the lower cup-shaped section during the casting process. After the casting is completed, the only machining required is for the inlet and outlet openings 42, 48 and the opening 46 through the tubular member of upper cup-shaped section. Thus the described design provides for simplicity of fabrication as well as effectiveness of operation.

A slightly modified embodiment of the invention is illustrated in FIG. 2 and like reference numerals will be applied to the corresponding parts with but the addition of a prime notation. The major point of modification is in the actual construction, the two cup-shaped sections 10′, 12′ being formed without integral central tubular members, the cup-shaped sections being otherwise substantially like those described in connection with the first embodiment of the invention. After the cup-shaped sections 10′, 12′ have been cast, a central threaded opening 60 is formed in the lower cup-shaped section 12′ to receive a stud 30′ that is suitably locked in such opening by a lock nut 62. A separate tube 64 is secured to the base portion of the lower cup-shaped section 12′ by a pressed fit and projects upwardly therefrom to a position slightly below the base of the upper cup-shaped section 10' thus automatically providing an oil passage between the upper portion of the housing above the paper and the return or outlet conduit through the center of such tubular member. Other than these structural departures, the FIG. 2 structure and its utilization are substantially as described in connection with FIG. 1 and therefore will not be repeated.

It will be obvious that various other modifications and/or alterations can be made in the described structures without departing from the spirit of the invention and the foregoing description of two embodiments of the invention is to be considered purely exemplary and not in a limiting sense. The actual scope of the invention is to be indicated only by reference to the appended claims.

What is claimed is:

1. A filter unit comprising a housing having two separable generally cup-shaped sections arranged for sealing juncture at their lips, a compressible roll of tissue filter element in said housing, said housing being arranged to engage said filter element, said housing be arranged so that the separation of said cup-shaped sections exposes a wall of said filter element extending in the general direction of the endwise longitudinal axis of said housing, an inlet to said housing adjacent the upstream side of said filter element, an outlet to said housing adjacent the downstream side of said filter element, and means axially disposed relative to said housing and said filter element and releasably inter-connecting said cup-shaped sections for urging said cup-shaped sections toward one another to establish the sealing juncture therebetween and means in said housing to effect radial compression of said filter element, whereby said filter element is compressed in a direction substantially perpendicular to the endwise longitudinal axis of said housing and substantially entirely fills the radial cross-section of said housing.

2. A filter unit according to claim 1 wherein said filter element is radially compressible and said cup-shaped sections are dimensioned so as to exert radial compressive force on said filter element at least at one axial position thereon when assembled in sealing juncture at their lips.

3. A filter unit as claimed in claim 1 wherein said interconnecting means includes a single threaded cap nut.

4. A filter unit as claimed in claim 1 wherein said interconnecting means is operable to forceably separate said cup-shaped sections.

5. A filter unit as claimed in claim 1 wherein at least one of said cup-shaped sections has an interior transverse dimension less than that of said filter element adjacent the bottom of the housing.

6. A filter unit according to claim 1 wherein the axis of each cup-shaped section is substantially coaxial with the axis of said cylindrical filter element.

7. A filter unit as claimed in claim 6 wherein the interior axial length of said housing is slightly less than the axial length of said cylindrical filter element.

References Cited by the Examiner

UNITED STATES PATENTS

| | | | |
|---|---|---|---|
| 425,431 | 4/1890 | Hyatt | 210—494 X |
| 1,753,809 | 4/1930 | Short | 210—494 X |
| 1,761,493 | 6/1930 | Babitch | 210—494 |
| 2,115,577 | 4/1938 | Goldman | 210—494 |
| 2,274,352 | 2/1942 | Wood | 210—443 X |
| 2,349,174 | 5/1944 | Klinkhamer | 210—494 X |
| 2,432,475 | 12/1947 | Griffith | 210—437 X |
| 2,572,981 | 10/1951 | Briggs | 210—494 X |
| 2,661,846 | 12/1953 | Lash et al. | 210—494 X |
| 2,750,048 | 6/1956 | Hilbish | 210—494 X |
| 2,895,615 | 7/1959 | Oathout | 210—494 X |
| 2,928,547 | 3/1960 | Lawrence | 210—494 X |
| 2,988,225 | 6/1961 | Supinger | 210—439 |
| 3,173,868 | 3/1965 | Blomquist | 210—455 X |

FOREIGN PATENTS 1,152,267 9/1957 France.

REUBEN FRIEDMAN, *Primary Examiner.*

F. W. MEDLEY, *Assistant Examiner.*